United States Patent Office 3,015,248
Patented Jan. 2, 1962

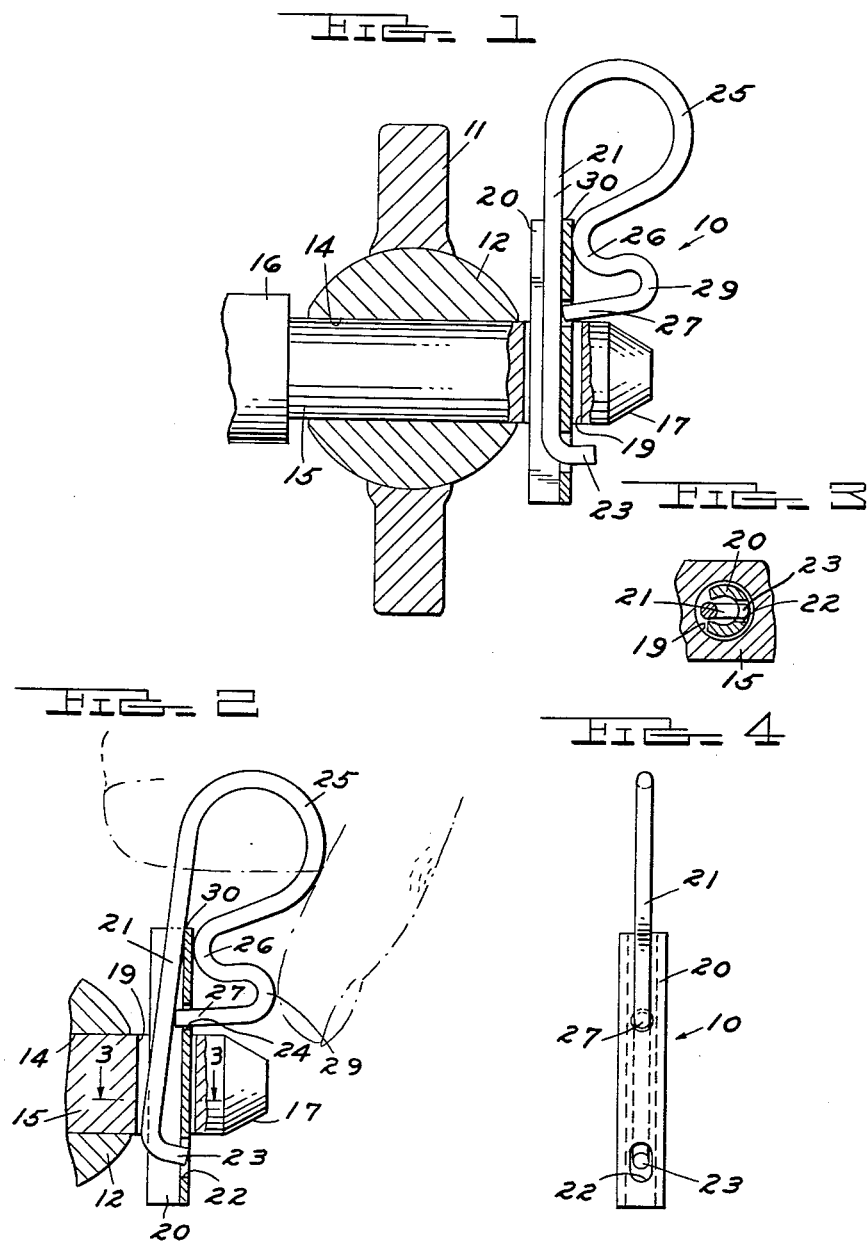

3,015,248
LINCH PIN WITH SPRING RETAINER MEANS
William G. Spurlin, Dearborn, Mich., assignor to Ford Motor Company, Dearborn, Mich., a corporation of Delaware
Filed May 7, 1958, Ser. No. 733,564
2 Claims. (Cl. 85—8.3)

This invention relates to a linch pin construction.

Linch pins are used as retainers extending transversely of a shaft, being received within a transverse bore of the shaft and serving to retain another part upon the shaft. Linch pins are adapted for ready removal and reinsertion in the transverse bore of the shaft, and are provided with some mechanical means for retention of the linch pin against fortuitous displacement.

The linch pin of the present invention is particularly adapted for use on farm implements and for coupling farm implements to tractors. This linch pin is quickly and readily inserted and removed, and at the same time resists to a maximum displacement of the pin due to contact with heavy brush and other growth to which linch pins in agricultural service are subjected.

This comprises a straight, hollow linch pin body preferably having a generally U shaped cross section. A springy, wire-like retainer extends lengthwise within the body and has a first terminal end projecting laterally through a hole adjacent one end of the body. The retainer projects from the other end of the body in a laterally extending loop, preferably terminating in an end received within a second hole in the body, the retainer receiving holes of the body being spaced to lie one on each side of the shaft or pin with which the linch pin is used. The retainer resiliently presses against the outside of the body to hold the first terminal end of the retainer projecting through the body to hold the linch pin against displacement. By rocking the retainer somewhat against its spring bias, the terminal end of the retainer can be withdrawn into the hole in the body to permit the linch pin to be withdrawn.

Among the objects of the present invention are to provide an improved linch pin which is easily inserted and removed, which is dependable and long lived in operation, which resists to the utmost fortuitous displacement, and which is readily manufactured; and generally to improve linch pins of the type described.

Other objects, and objects relating to details and economies of manufacture and use will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

FIGURE 1 is a vertical section showing a typical use of the linch pin of the present invention in an assembly including a tractor lower link and implement cross shaft, the link and portions of the cross shaft and linch pin being shown in section.

FIGURE 2 is a view similar to FIGURE 1, showing the linch pin retainer in position for removal of the linch pin.

FIGURE 3 is a transverse section of the linch pin and a portion of the cross shaft, taken on the line 3—3 of FIGURE 2.

FIGURE 4 is a side elevation of the linch pin.

Referring now to the drawings, the linch pin 10 of the present invention is shown as applied to an assembly of a tractor lower link and cross shaft with which it is frequently used. Tractors of the 3-point hitch type are provided with lower links for receiving implements, one lower link 11 being shown in the drawings. The link 11 is provided, adjacent its rearward end, with a ball 12 capable of universal movement in the link and provided with a diametrically extending bore 14. The bore 14 receives a cylindrical pin portion 15 formed on the end of a cross shaft 16 which forms a part of an agricultural implement. The outer end of the pin portion 15 may be chamfered at 17 if desired. A transverse circular bore 19 adjacent the chamfered end of the pin portion 15 is provided for receiving the linch pin 10 to retain the parts in assembled relation.

The linch pin 10 is formed of a linch pin body 20 and a retainer 21, which serves to retain the body against displacement from the bore 19. The linch pin body 20 is hollow, perferably comprising a steel strip formed into a generally U-shaped cross section, the outer surface of the linch pin conforming generally to the surface of the bore 19 and extending for substantially more than 180° so as to be received without excessive clearance within the bore 19. The body 20 is provided with a laterally extending hole 22 adjacent one end of the body, the hole 22 preferably being somewhat elongated lengthwise of the body. A second hole 24 is provided in the body towards the opposite end thereof and spaced from the hole 22 a distance slightly greater than the diameter of the pin portion 15. The body 20 is formed of heat treated, plated steel having a hardness on the order of 50 Rockwell "C."

The linch pin retainer 21 is formed of a piece of heat treated wire formed to the general shape indicated in the drawings. The springy wirelike retainer 21 extends along the inside of the body 20 and a terminal end portion 23 of the retainer extends a short distance through the hole 22 in the body.

The retainer 21 extends beyond the opposite end of the body 20 in a laterally extending bight portion 25 lying in the plane of the terminal portion 23 and has a rounded contour 26 bearing against the outer surface of the body 20 a short distance from the end of the body. The retainer is then formed into a second terminal portion 27 extending generally perpendicular to the body 20, the extreme end of the portion 27 being received within the hole 24 of the bore. In the normal position of the linch pin 10, shown in FIGURE 1, the contour 26 of the bight portion 25 resiliently presses against the outer surface of the body 20 so as to hold the retainer tightly against the inner surface of the body along an element passing through the holes 22 and 24 of the body, the terminal portion 23 of the retainer projecting at a maximum from the body. The linch pin body 20 is retained within the bore 19 by the terminal portions 23 and 27 of the retainer, and in this position of the retainer there is a slight gap between the end of the terminal portion 27 and the portion of the retainer 21 received within the body.

In order to remove the linch pin 10, the index finger is inserted within the bight portion 25 of the retainer 21 and the retainer is rocked against its bias to withdraw the terminal end 23 of the retainer into the hole 22 of the body. This may be done conveniently by placing the thumb on the bight 29 adjacent the terminal portion 27 of the retainer and pressing with the thumb at the same time that the bight is pulled to the right, as shown in the drawings, by the index finger, the retainer pivoting about the end edge 30 of the retainer 20. Pressure of the thumb on the bight 29 presses the terminal portion 27 of the retainer inwardly through the hole 24 of the body, closing the gap between the extreme end of the terminal portion 27 and the portion of the retainer within the body 20, and the terminal portion aiding in pivoting the retainer on the edge 30 to withdraw the terminal portion 23 within the hole 22. After the retainer 21 is moved to the position indicated in FIGURE 2, the linch pin 10 may be withdrawn from the bore 19.

The linch pin of the present invention requires a lateral movement of the bight portion of the retainer against the spring biased retainer sufficiently to withdraw the terminal portion 23 of the bight within the hole 22 of the body 20 to unlatch the pin. The unlatching of the linch pin must immediately proceed the withdrawal of the pin, inasmuch as the retainer must be held in rotated, unlatched position to permit withdrawal of the pin. Accordingly, it has been found that this pin resists to the utmost fortuitous displacement by contact with brush and in other agricultural service.

I claim:

1. A linch pin, comprising an elongated hollow linch pin body having a laterally extending hole adjacent one end and a second hole spaced from the first hole towards the other end of the body, said holes being aligned longitudinally of the body, and a springy wide-like retainer having a substantially straight part extending longitudinally within the body along the wall thereof and having a first terminal portion extending through the hole in the body and projecting laterally a short distance beyond the outer surface of the body, the retainer projecting a substantial distance beyond the other end of the body in a laterally extending open loop shaped to receive the index finger of an operator and lying generally in the plane of said first terminal portion, the end of said loop resiliently bearing against the outside of the body adjacent said other end and substantially in longitudinal alignment with said holes and urging the retainer against the inner wall of the body adjacent the hole, and said retainer having a second terminal portion extending from the loop and terminating in a portion generally perpendicular to the linch pin body and spaced from said first terminal portion, said perpendicular portion having its end received within the second hole in the body and lying in a common plane with the portion of the retainer extending within the body, the first terminal portion of the retainer being withdrawn in the hole in the body upon rocking the retainer against its bias.

2. A linch pin, comprising an elongated hollow linch pin body having a laterally extending hole adjacent one end thereof, and a springy wire-like retainer having a substantially straight part extending longitudinally within the body along the wall thereof and having a first terminal portion extending through the hole in the body and projecting laterally a short distance beyond the outer surface of the body, the retainer projecting a substantial distance beyond the other end of the body in a laterally extending open loop shaped to receive the index finger of an operator and lying generally in the plane of said first terminal portion, the end of said loop resiliently bearing against the outside of the body adjacent said other end and urging the retainer against the inner wall of the body throughout its length, the first terminal portion of the retainer being withdrawn into the hole in the body upon rocking the retainer about said other end of the body by engaging a finger within the loop and rocking the retainer against its bias.

References Cited in the file of this patent
UNITED STATES PATENTS

| | | |
|---|---|---|
| 962,298 | Babbitt | June 21, 1910 |
| 2,076,726 | Kamen | Apr. 13, 1937 |
| 2,382,166 | Martin | Aug. 14, 1945 |
| 2,550,217 | Bourque | Apr. 24, 1951 |
| 2,661,228 | Wilson | Dec. 1, 1953 |
| 2,775,927 | Wulle | Jan. 1, 1957 |

UNITED STATES PATENT OFFICE
CERTIFICATION OF CORRECTION

Patent No. 3,015,248            January 2, 1962

William G. Spurlin

It is hereby certified that error appears in the above numbered patent requiring correction and that the said Letters Patent should read as corrected below.

Column 3, line 22, for "wide-like" read -- wire-like --.

Signed and sealed this 24th day of April 1962.

(SEAL)
Attest:

ESTON G. JOHNSON
Attesting Officer

DAVID L. LADD
Commissioner of Patents